(12) United States Patent
Konishi

(10) Patent No.: US 7,471,002 B2
(45) Date of Patent: Dec. 30, 2008

(54) VOLTAGE CONTROLLER OF ALTERNATOR FOR VEHICLE

(75) Inventor: Toshiya Konishi, Chita-gun (JP)

(73) Assignee: Denso Corporation, Kariya (JP)

( * ) Notice: Subject to any disclaimer, the term of this patent is extended or adjusted under 35 U.S.C. 154(b) by 210 days.

(21) Appl. No.: 11/636,526

(22) Filed: Dec. 11, 2006

(65) Prior Publication Data

US 2007/0147003 A1 Jun. 28, 2007

(30) Foreign Application Priority Data

Dec. 26, 2005 (JP) ............................ 2005-371807

(51) Int. Cl.
| | |
|---|---|
| F02N 11/04 | (2006.01) |
| H02K 23/52 | (2006.01) |
| H02P 9/04 | (2006.01) |
| H02H 7/06 | (2006.01) |
| H02P 9/00 | (2006.01) |
| H02P 11/00 | (2006.01) |
| H01R 9/00 | (2006.01) |
| H02B 1/04 | (2006.01) |
| H02B 1/20 | (2006.01) |
| H02B 1/01 | (2006.01) |
| H05K 5/06 | (2006.01) |
| H05K 5/00 | (2006.01) |
| H02K 11/00 | (2006.01) |

(52) U.S. Cl. ............................ 290/31; 322/28; 310/71; 361/775; 361/822; 361/823; 361/824; 361/825; 361/826; 361/827; 361/828; 174/17.08; 174/18

(58) Field of Classification Search ................ 290/31; 322/28; 310/71; 361/775, 822–828; 174/17.08, 174/18
See application file for complete search history.

(56) References Cited

U.S. PATENT DOCUMENTS

| | | | | | |
|---|---|---|---|---|---|
| 3,173,077 | A | * | 3/1965 | Kirk et al. ...................... | 322/73 |
| 3,273,020 | A | * | 9/1966 | Murphey ..................... | 361/627 |
| 4,128,801 | A | * | 12/1978 | Gansert et al. ................ | 322/28 |
| 4,176,904 | A | * | 12/1979 | Obuch ........................ | 439/690 |
| 4,288,711 | A | * | 9/1981 | Hagenlocher et al. ..... | 310/68 D |
| 4,588,933 | A | * | 5/1986 | Sun ........................ | 318/400.21 |
| 4,799,309 | A | * | 1/1989 | Cinzori et al. ................ | 29/596 |
| 4,899,209 | A | * | 2/1990 | Shibata et al. .............. | 257/687 |

(Continued)

FOREIGN PATENT DOCUMENTS

EP 0 703 588 A1 3/1996

(Continued)

*Primary Examiner*—Julio C Gonzalez
*Assistant Examiner*—Pedro J Cuevas
(74) *Attorney, Agent, or Firm*—Oliff & Berridge, PLC

(57) ABSTRACT

A voltage controller has an integrated control circuit having a plurality of lead wires, a plurality of connecting terminals, and a terminal holding body holding the terminals such that a portion of each terminal is protruded from a surface of the body so as to be connected with one lead wire. The control circuit controls an output voltage of an alternator by receiving or outputting signals transmitted through the lead wires and the connecting terminals. The protruded terminals are disposed so as to be aligned along a plurality of lines on the surface of the body. Therefore, an on-surface distance between terminals adjacent to each other is sufficiently set at a large value, and the arrangement of the terminals prevents the terminals from being short-circuited.

10 Claims, 6 Drawing Sheets

U.S. PATENT DOCUMENTS

| | | | | |
|---|---|---|---|---|
| 4,957,876 | A * | 9/1990 | Shibata et al. | 29/827 |
| 4,998,865 | A * | 3/1991 | Nakanishi et al. | 417/423.7 |
| 5,095,235 | A * | 3/1992 | Kitamura | 310/68 D |
| 5,139,443 | A * | 8/1992 | Armando | 439/620.26 |
| 5,382,169 | A * | 1/1995 | Bailey et al. | 439/76.2 |
| 5,403,193 | A * | 4/1995 | Ito et al. | 439/34 |
| 5,613,844 | A * | 3/1997 | Tuckey et al. | 417/366 |
| 5,677,616 | A * | 10/1997 | Ooiwa | 322/17 |
| 5,682,070 | A * | 10/1997 | Adachi et al. | 310/71 |
| 5,717,271 | A | 2/1998 | Aoki et al. | 310/242 |
| 5,764,487 | A * | 6/1998 | Natsume | 361/775 |
| 5,821,744 | A | 10/1998 | Shinjo et al. | 324/207.2 |
| 5,892,676 | A * | 4/1999 | Hsieh | 363/141 |
| 5,956,231 | A * | 9/1999 | Yamada et al. | 361/728 |
| 6,061,895 | A | 5/2000 | Shinjo et al. | 29/602.1 |
| 6,099,325 | A * | 8/2000 | Parkhill | 439/76.1 |
| 6,123,585 | A * | 9/2000 | Hussong et al. | 439/652 |
| 6,427,316 | B1 | 8/2002 | Shinjo et al. | 29/602.1 |
| 6,434,008 | B1 * | 8/2002 | Yamada et al. | 361/728 |
| 6,492,891 | B2 | 12/2002 | Yamaguchi | 336/198 |
| 6,520,780 | B2 * | 2/2003 | Chemin | 439/76.2 |
| 6,528,911 | B1 * | 3/2003 | De Petris | 310/64 |
| 6,535,392 | B2 * | 3/2003 | Yamamoto et al. | 361/728 |
| 6,538,352 | B2 * | 3/2003 | Asao | 310/68 D |
| 6,655,989 | B1 * | 12/2003 | Gale et al. | 439/559 |
| 6,810,868 | B2 | 11/2004 | Tsunenaga et al. | 123/634 |
| 6,839,236 | B2 | 1/2005 | Yamamoto et al. | 361/704 |
| 6,955,567 | B2 * | 10/2005 | Inaba et al. | 439/651 |
| 7,095,150 | B2 * | 8/2006 | Norell et al. | 310/194 |
| 7,116,032 | B2 * | 10/2006 | Kashihara et al. | 310/242 |
| 7,150,633 | B2 * | 12/2006 | Ishikura et al. | 439/76.1 |
| 7,261,582 | B2 * | 8/2007 | Wu | 439/352 |
| 7,291,034 | B2 * | 11/2007 | Wu | 439/358 |
| 7,410,365 | B2 * | 8/2008 | Wu | 439/76.1 |
| 2002/0024324 | A1 * | 2/2002 | Yamamoto et al. | 322/28 |
| 2002/0053841 | A1 * | 5/2002 | Asao | 310/68 B |
| 2002/0158539 | A1 * | 10/2002 | Oohashi et al. | 310/207 |
| 2003/0016502 | A1 * | 1/2003 | Yamada et al. | 361/705 |
| 2003/0042806 | A1 * | 3/2003 | Inaba et al. | 310/58 |
| 2003/0107292 | A1 * | 6/2003 | Kashihara et al. | 310/239 |
| 2004/0080231 | A1 * | 4/2004 | You | 310/239 |
| 2006/0087192 | A1 * | 4/2006 | Norell et al. | 310/194 |
| 2006/0087789 | A1 * | 4/2006 | Norell et al. | 361/103 |
| 2006/0097704 | A1 * | 5/2006 | Deverall et al. | 323/201 |
| 2006/0214524 | A1 * | 9/2006 | Kashihara et al. | 310/68 D |
| 2007/0147003 | A1 * | 6/2007 | Konishi | 361/704 |
| 2007/0206363 | A1 * | 9/2007 | Cespedes et al. | 361/748 |
| 2007/0285906 | A1 * | 12/2007 | Deverall et al. | 361/760 |
| 2008/0084128 | A1 * | 4/2008 | Neet et al. | 310/71 |

FOREIGN PATENT DOCUMENTS

| | | |
|---|---|---|
| JP | A 5-242922 | 9/1993 |
| JP | A 8-111130 | 4/1996 |
| JP | A 8-203757 | 8/1996 |
| JP | A 8-205484 | 8/1996 |
| JP | A 8-266019 | 10/1996 |
| JP | A 9-105757 | 4/1997 |
| JP | A 9-139141 | 5/1997 |
| JP | A 10-84659 | 3/1998 |
| JP | A 2002-75757 | 3/2002 |
| JP | A 2003-244913 | 8/2003 |
| JP | A 2003-303726 | 10/2003 |

* cited by examiner

VOLTAGE CONTROLLER OF ALTERNATOR FOR VEHICLE

CROSS-REFERENCE TO RELATED APPLICATION

This application is based upon and claims the benefit of priority of the prior Japanese Patent Application 2005-371807 filed on Dec. 26, 2005 so that the contents of which are incorporated herein by reference.

BACKGROUND OF THE INVENTION

1. Field of the Invention

The present invention relates to a voltage controller which controls an output voltage of an alternator mounted on a vehicle such as a passenger car, a truck or the like.

2. Description of Related Art

An alternator mounted on a vehicle has a voltage controller, and the controller has an integrated circuit (IC) chip acting as a control circuit to control an output voltage of the alternator. This IC chip has recently been highly integrated and downsized. For example, Published Japanese Patent First Publication No. 2003-244913 discloses a voltage controller having a small-sized IC chip. In this Publication, the IC chip is sealed with an insulator made of resin or the like. Lead wires extending from the IC chip are protruded from the insulator. The controller further has a terminal holding body and connecting terminals held in the holding body. Portions of the terminals are protruded from a surface of the holding body and are, respectively, connected with the lead wires. The terminals are disposed to be aligned with one another along a single straight line on the surface of the holding body. The IC chip is electrically connected with a rectifier and a brush apparatus of the alternator and an external control unit through the connecting terminals and the lead wires.

However, as the IC chip is downsized, intervals among the lead wires of the IC chip are narrowed. In this case, intervals among the terminals connected with the lead wires are also inevitably narrowed. Therefore, an on-surface distances (i.e., creepage distance) between two terminals adjacent to each other cannot be sufficiently set at a large value. In this case, when the terminals are covered with water or the like, the terminals are short-circuited so as to leak an electric current of one terminal to another terminal. Further, corrosions and disconnections among the terminals occur due to leakage of electric currents among the terminals. In this specification, an on-surface distance between two terminals adjacent to each other is defined as a distance on the surface of the holding body from which the terminals are protruded.

SUMMARY OF THE INVENTION

An object of the present invention is to provide, with due consideration to the drawbacks of the conventional voltage controller, a voltage controller wherein a probability of leakage of electric currents among terminals is reduced even when intervals of lead wires of a control circuit connected with the terminals are narrowed.

According to a first aspect of this invention, the object is achieved by the provision of a voltage controller comprising an integrated control circuit having a plurality of lead wires, a plurality of connecting terminals respectively connected with the lead wires, and a terminal holding body holding the connecting terminals such that portions of the connecting terminals are protruded from a surface of the terminal holding body so as to be connected with the lead wires. The connecting terminals protruded from the terminal holding body are disposed so as to be aligned along a plurality of lines on the surface of the terminal holding body.

With this arrangement, the integrated control circuit controls an output voltage of an alternator by receiving or outputting signals through the lead wires and the connecting terminals. Because the connecting terminals are aligned along a plurality of lines, an on-surface distance between two terminals adjacent to each other becomes longer than that in case of the connecting terminals aligned along a single line. Therefore, even though intervals of the lead wires 262 are narrowed, intervals of the connecting terminals can be sufficiently set at large values.

In this case, even when the connecting terminals are covered with water or the like, the arrangement of the connecting terminals set at large intervals prevents the terminals from being short-circuited. Accordingly, a probability of leakage of electric currents among the terminals 253 can be considerably reduced.

According to a second aspect of this invention, the object is also achieved by the provision of a voltage controller comprising the integrated control circuit, the connecting terminals, and the terminal holding body. The terminal holding body has a plurality of surfaces, and the connecting terminals are classified into a plurality of groups such that the connecting terminals in each group are protruded from one of the surfaces of the terminal holding body.

With this arrangement, because the connecting terminals in each group are protruded from the corresponding surface of the terminal holding body, anon-surface distance between two terminals adjacent to each other inevitably becomes longer than that in the prior art wherein all the connecting terminals are protruded from a single surface of the terminal holding body. Accordingly, a probability of leakage of electric currents among the terminals can be considerably reduced.

DETAILED DESCRIPTION OF THE PREFERRED EMBODIMENTS

Embodiments of the present invention will now be described with reference to the accompanying drawings. However, these embodiments should not be construed as limiting the present invention to structures of those embodiments, and the structure of this invention may be combined with that based on the prior art.

Embodiment 1

Figure 1:
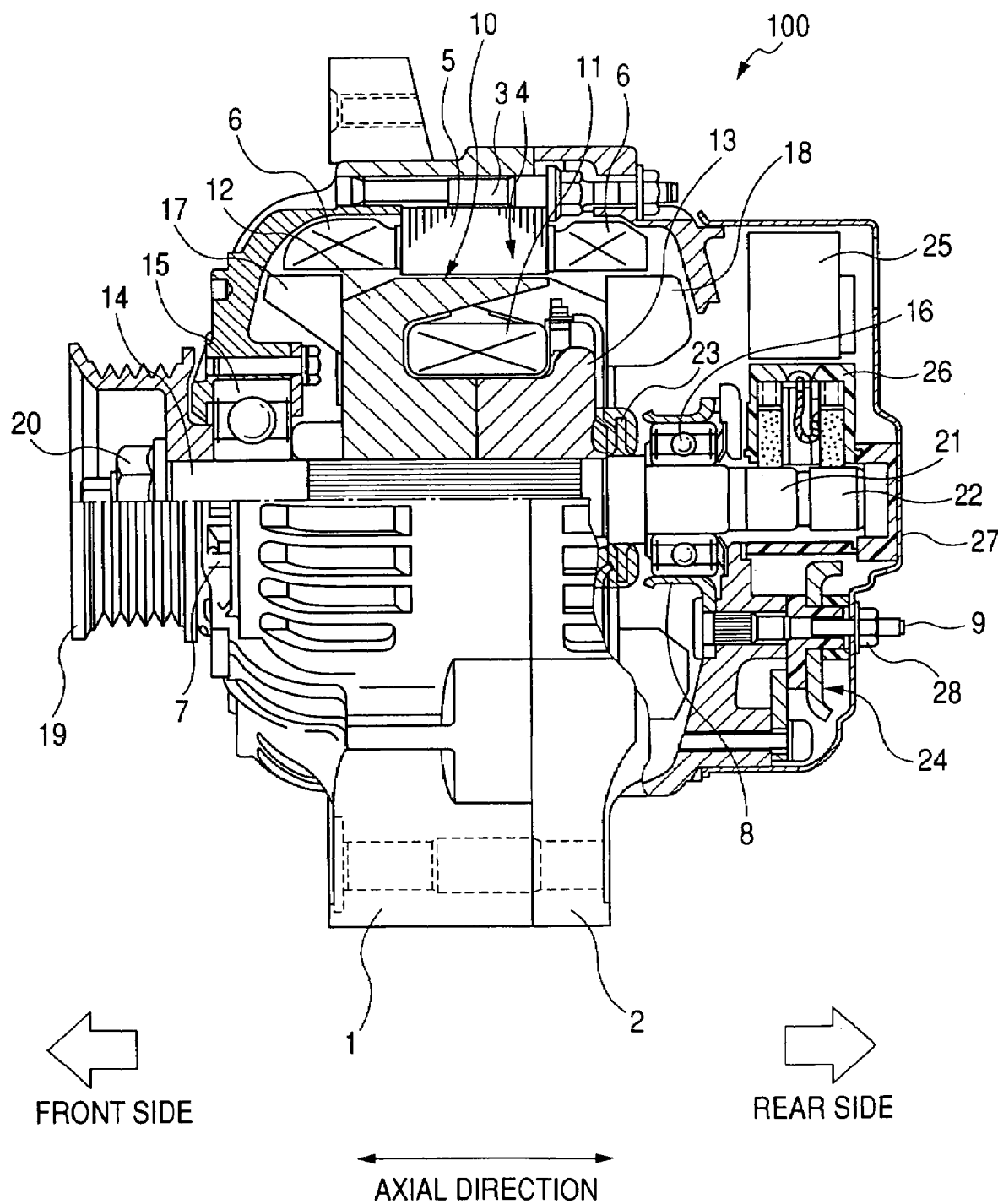
FIG. 1 is a vertical sectional view of an alternator having a voltage controller according to embodiments.

FIG. 1 is a vertical sectional view of an alternator having a voltage controller according to embodiments.

As shown in FIG. 1, an alternator 100 for a vehicle has a rotor 10 rotatable on its center axis extending along an axial direction of the alternator 100, a cylindrical stator 4 disposed to surround the outer surface of the rotor 10 and to generate an alternating current according to an electromagnetic interaction with the rotor 10, a rectifier 24 rectifying the alternating current of the stator 4 to generate a direct current, a voltage controller 25 controlling a voltage of the current of the stator 4, a brush apparatus 26 supplying an exciting current to the rotor 10, a front frame 1 with which front portions of the rotor 10 and the stator 4 on a front side of the alternator 100 are covered, a rear frame 2 with which rear portions of the rotor 10 and the stator 4 on a rear side of the alternator 100 are covered, and a rear cover 27 attached to the rear frame 2 so as to cover the rectifier 24, the controller 25 and the brush apparatus 26 disposed on the rear side with the rear cover 27.

Each of the frames 1 and 2 is formed in a cup shape, and the frames 1 and 2 are tightly attached to each other by a plurality of bolts 3 so as to face open surfaces of the frames 1 and 2 each other. The stator 4 is fixed to the inner surface of the frame 1. A cylindrical bearing box 7 is integrally formed with the frame 1. A bearing box 8 made of iron is attached to the frame 2 by bolts 9 having knurling portions.

The stator 4 has a stator core 5 and stator windings 6 wound around the core 5. The rotor 10 has pole cores 12 and 13 facing each other along the axial direction, filed wirings 11 wound around the cores 12 and 13, and a rotary shaft 14 extending along the axial direction and being fixed to the cores 12 and 13. A front end portion of the shaft 14 is rotatably held by a bearing 15 of the box 7, and a rear end portion of the shaft 14 is rotatably held by a bearing 16 of the box 8. A pulley 19 is coupled with the front end portion of the shaft 14 by a nut 20. The shaft 14 is rotated on its center axis in response to a rotational force transmitted from an engine (not shown) of the vehicle through the pulley 19. The cores 12 and 13 fixed to the shaft 14 are rotated with the shaft 14.

A centrifugal cooling fan 17 is attached to an end surface of the core 12 on the front side, and a centrifugal cooling fan 18 is attached to an end surface of the core 13 on the rear side. Blades of the fan 17 stand on the end surface of the core 12 on the front side and are inclined toward a rotational direction of the rotor 10, so that the winding 11 is cooled by a diagonal flow generated in the fan 17.

A pair of slip rings 21 and 22 is disposed at the rear end portion of the shaft 14 on the outside of the rear frame 2. The rings 21 and 22 are electrically connected with the wiring 11 through conductive terminals 23 of the wiring 11.

Electric members composed of the rectifier 24, the controller 25 and the brush apparatus 26 are disposed on the outside of the frame 2. The rectifier 24 rectifies a three-phase alternating current voltage output from the windings 6 of the stator 4 to obtain a direct current voltage. The controller 25 controls an output voltage of the alternator 100 by adjusting the exciting current flowing through the wirings 11. The brush apparatus 26 has brushes pressed to the slip rings 21 and 22 and gives the direct current obtained in the rectifier 24 to the wirings 11 as the exciting current.

The electric members are covered with the rear cover 27 made of a steel plate or a resin plate, so that the cover 27 protects the electric members. The electric members are fixed to an outer surface of the frame 2 by the bolts 9. The bolts 9 are inserted into the cover 27 and the frame 2 such that the electric members are fixedly disposed between the frame 2 and the cover 27, and nuts 28 of the bolts 9 are fastened to the cover 27. The cover 27 has a plurality of cooling wind inlet windows disposed around the brush apparatus 26 in a concentric circular shape.

When the rotor 10 is rotated in response to a rotational force of an engine while receiving an exciting current supplied through the brush apparatus 26, the rotor 10 generates a magnetic field. The stator 4 generates an alternating current according to an electromagnetic interaction with the rotor 10. The rectifier 24 converts the alternating current into a direct current and outputs the direct current to a battery of a vehicle. The brush apparatus 26 receives a part of the direct current and supplies the current through the brushes as the exciting current. The controller 25 adjusts the voltage of the exciting current supplied from the apparatus 26 to the rotor 10 to control an output voltage generated in the alternator 100. A cooling wind is taken into the alternator 100 by the fan 18 rotated with the rotor 10. This wind passes through the inlet windows of the cover 27 and cools the electric members.

Figure 2:
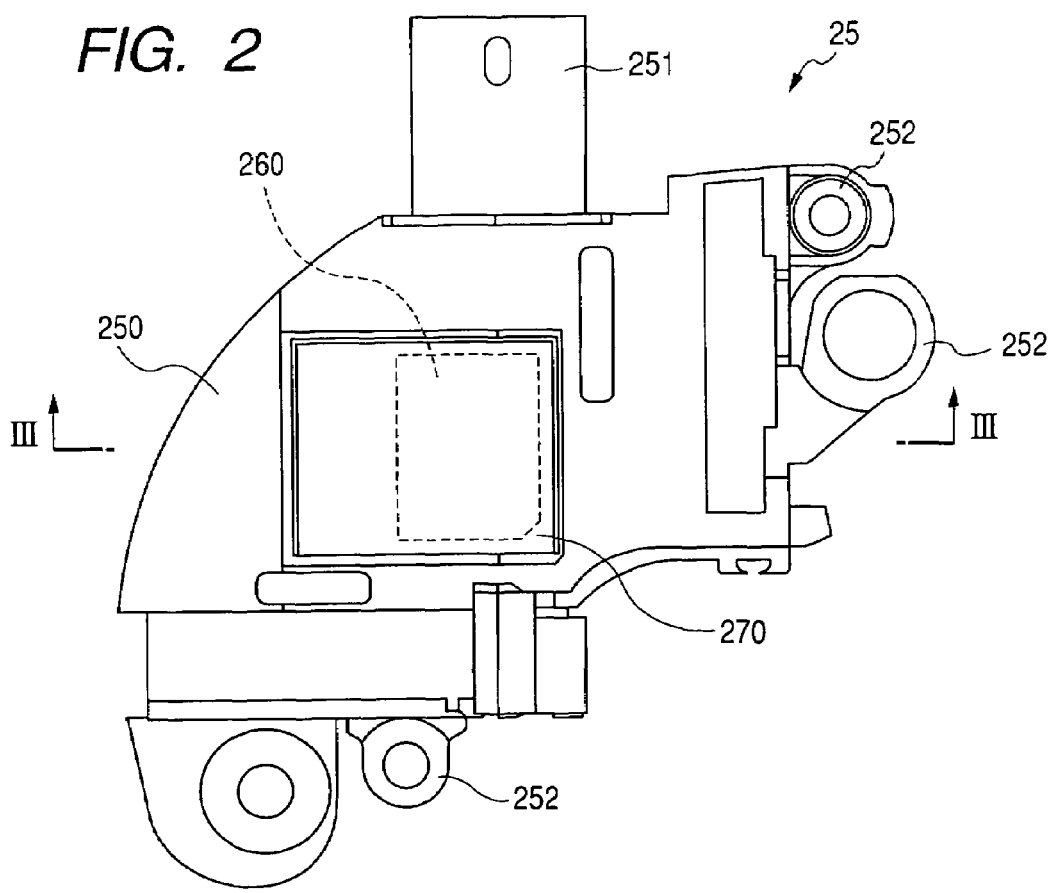
FIG. 2 is a top view of the voltage controller seen from the rear side of the alternator shown in FIG. 1.
Figure 3:
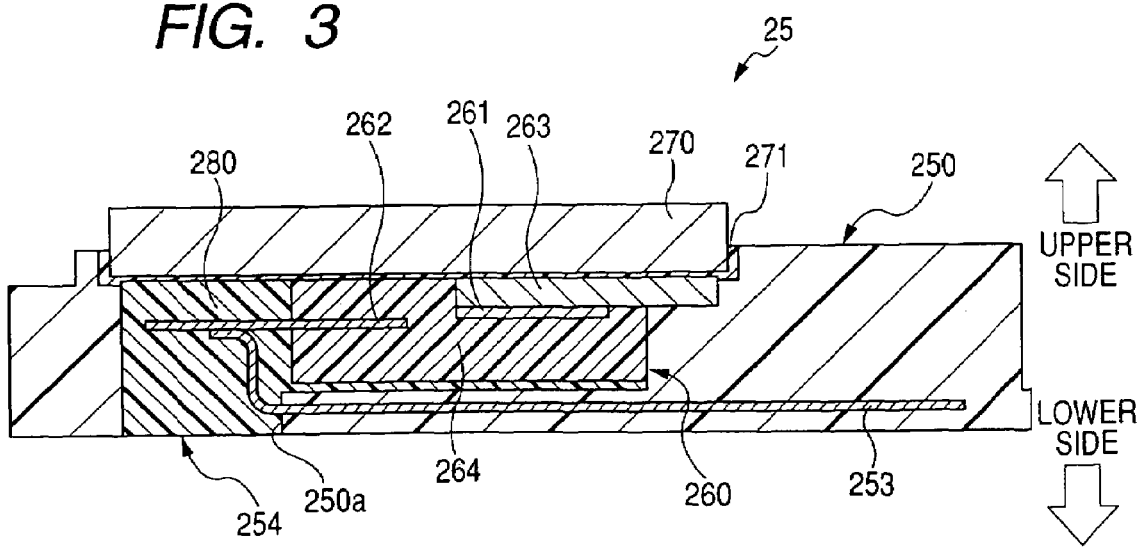
FIG. 3 is a sectional view taken substantially along line III-III of FIG. 2 and shows a connecting terminal connected with a lead wire according to the first embodiment.

Next, the controller 25 is described in detail. FIG. 2 is a top view of the controller 25 seen from the rear side of the alternator 100. FIG. 3 is a sectional view taken substantially along line III-III of FIG. 2 and shows a connecting terminal connected with a lead wire according to the first embodiment.

As shown in FIGS. 2 and 3, the controller 25 has an integrated control circuit body 260 controlling an output voltage of the alternator 100, a terminal holding body 250, and a plurality of connecting terminals 253 held in the holding body 250 and connected with lead wires of the circuit body 260. The body 250 is made of resin so as to act as an insulator. The circuit body 260 is fixed to the holding body 250 so as to be accommodated in the holding body 250. A hollow portion 254 is formed so as to be surrounded by the body 250, and a surface 250a of the body 250 faces the hollow portion 254. The hollow portion 254 is finally buried with a sealing resin 280, as described later.

The circuit body 260 has an IC chip 261 formed of a silicon semiconductor, and lead wires 262 electrically connected with pads (not shown) of the IC chip 261 through bonding wires (not shown). The IC chip 261 has an electric circuit of the controller 25. The circuit body 260 may further have a heat sink 263 pressed to and directly attached to the IC chip 261, and a resin portion 264 fixedly and mechanically holding the IC chip 261, the lead wires 262 and the heat sink 263. End portions of the lead wires 262 are protruded from the resin portion 264 and are positioned in the hollow portion 254. The heat sink 263 is made of a metallic material superior in thermal conductivity to efficiently receive heat generated in the IC chip 261.

End portions of the connecting terminals 253 are protruded from the surface 250a of the body 250 and are positioned in the hollow portion 254. The connecting terminals 253 are, respectively, joined to the lead wires 262 in the hollow portion 254 with solder, so that each terminal 253 and the corresponding lead wire 262 are electrically connected with each other. Therefore, the electric circuit of the IC chip 261 is electrically connected with the rectifier 24, the windings 11 and an external control unit (not shown) through the lead wires 262 and the terminals 253. The IC chip 261 controls an output voltage of the alternator 100 by receiving and outputting signals from and to the rectifier 24, the windings 11 and the external control unit.

The controller 25 may further have a male connecter 251 integrally formed with the body 250, a plurality of external terminals 252 attached to the end portions of the body 250 and connected with other end portions of the terminals 253, a radiating fin 270 attached to the heat sink 263, the resin portion 264 and the sealing resin 280 through an adhesive layer 271 superior in thermal conduction. The fin 270 has an upper surface receiving the cooling wind taken into the alternator 100 by the fan 18. The surface of the fin 270 may have convex and concave portions to efficiently radiate heat to the atmosphere. Therefore, heat generated in the IC chip 261 is efficiently dispersed to the atmosphere through the heat sink 263 and the fin 270.

Assembling of the voltage controller 25 is described. The circuit body 260 is attached to the holding body 250, and the lead wires 262 protruded from the body 260 are joined to the terminals 253 protruded from the body 250 with solder in the hollow portion 254. Thereafter, the hollow portion 254 is packed with the sealing resin 280 such that the protruded lead wires 262 and the protruded terminals 253 including the soldered portions are surrounded by the resin 280. Epoxy resin is, for example, used as a material of the resin 280, and this resin is injected into the hollow portion 254 according to a potting injection.

Figure 4:
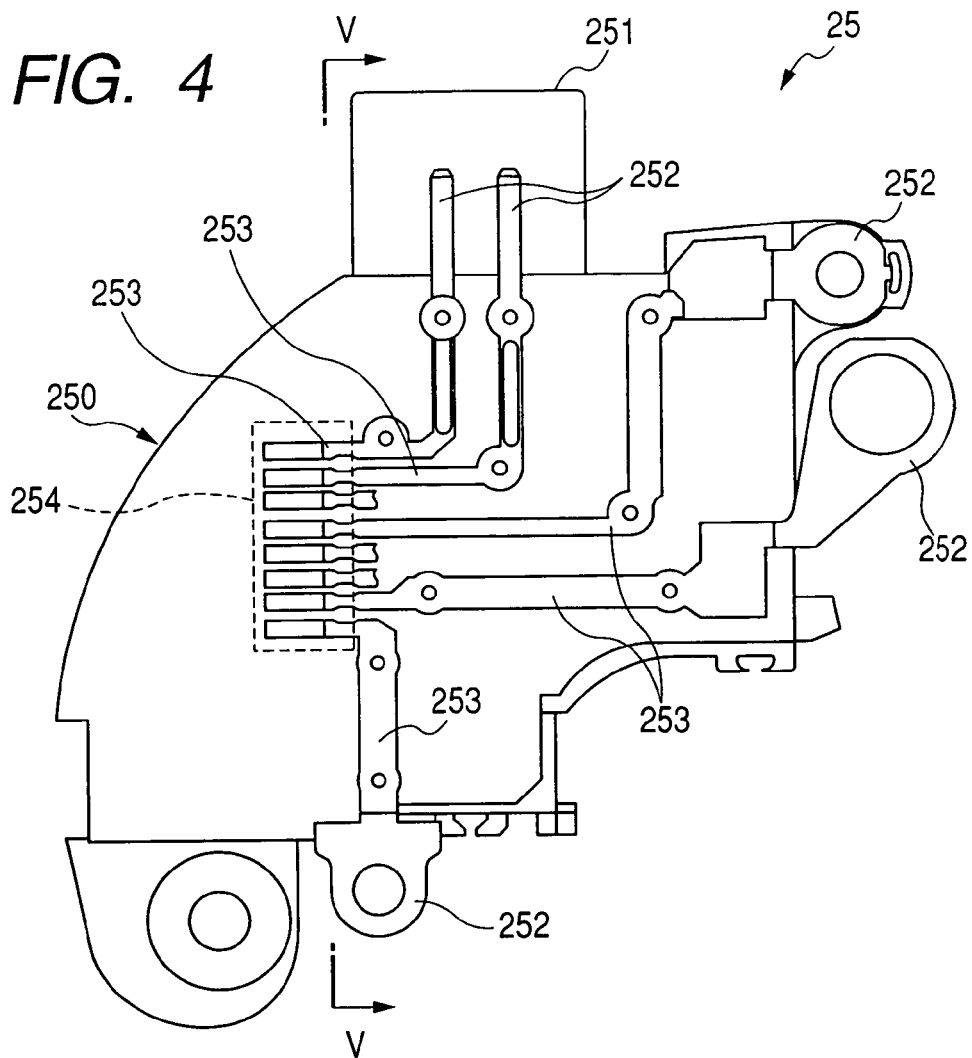
FIG. 4 shows the arrangement of terminals according to the first embodiment.

FIG. 4 shows the arrangement of the terminals 253 disposed in the body 250 according to the first embodiment.

As shown in FIG. 4, the terminals 253 are disposed in the body 250. That is, one end portions of the terminals 253 are exposed to the hollow portion 254, and other end portions of the terminals 253 are, respectively, connected with the external terminals 252. However, another end portion of a certain terminal 253 may be connected with another terminal 253 as an internal wiring.

Figure 5:
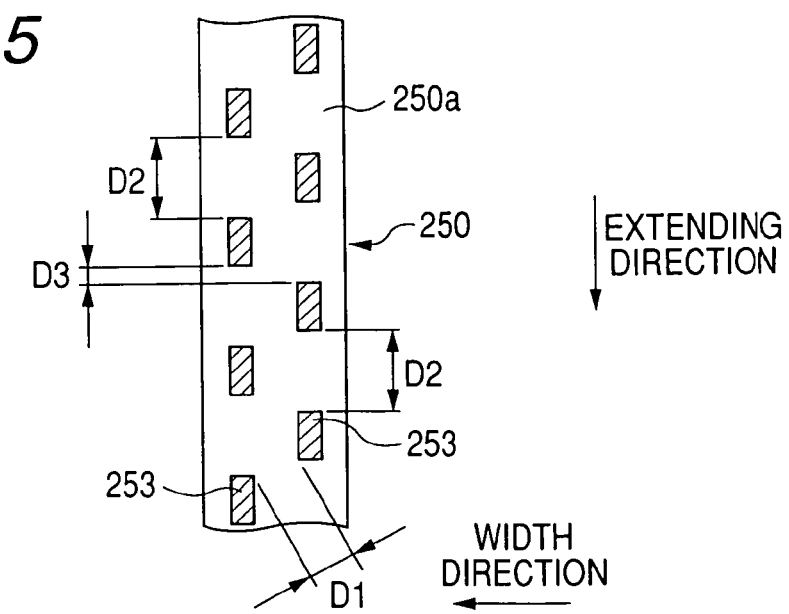
FIG. 5 is an enlarged sectional view taken substantially along line V-V of FIG. 4.

FIG. 5 is an enlarged sectional view taken substantially along line V-V of FIG. 4.

As shown in FIG. 5, each of the terminals 253 is protruded from the surface 250a of the body 250. The protruded terminals 253 are dividable into two groups, the terminals 253 in one group is disposed so as to be aligned with one another along a straight line L1 on the surface 250a of the body 250, and the terminals 253 in the other group is disposed so as to be aligned with one another along a straight line L2 on the surface 250a of the body 250. The lines L1 and L2 are parallel to each other. On the surface 250a, each of the terminals 253 disposed in the straight line L1 differs in a position along an extending direction of the straight lines L1 and L2 from the terminals 253 disposed in the other straight line L2. More specifically, when the terminals 253 in the lines L1 and L2 are seen along a width direction perpendicular to the extending direction on a plane of the surface 250a, the terminals 253 in the straight line L1 and the terminals 253 in the other straight line L2 are alternately disposed along the extending direction, and the terminals 253 in the lines L1 and L2 are disposed at equal intervals along the extending direction.

An on-surface distance D1 between two terminals 253, respectively, placed on the lines L1 and L2 and being adjacent to each other is set to be smaller than anon-surface distance D2 between two terminals 253 aligned along the same line and being adjacent to each other (D1<D2). Therefore, in the arrangement of the terminals 253 shown in FIG. 5, the terminals 253 are disposed on the surface 250a at the minimum on-surface distance D1.

Further, when all the terminals 253 in the lines L1 and L2 are seen along the width direction, two terminals 253 adjacent to each other is away from each other by a distance D3 along the extending direction. The on-surface distance D1 necessarily becomes larger than the distance D3 (D3<D1). For example, the on-surface distance D1 is several times as large as the distance D3. Assuming that all the terminals 253 are disposed, according to the prior art, to be aligned with one another along a single straight line, an on-surface distance between two terminals 253 adjacent to each other becomes equal to the value D3.

Therefore, the on-surface distance D1 according to this embodiment can be set to be larger than the on-surface distance D3 according to the prior art. In this case, even though the terminals 253 are covered with water or the like, the terminals are hardly short-circuited so as to leak an electric current of one terminal to another terminal. Accordingly, even when intervals of the lead wires 262 are narrowed, a probability of leakage of electric currents among the terminals 253 can be considerably reduced.

In this embodiment, the number of lines is set at two, and each line is set to a straight line. However, the terminals 253 may be disposed so as to be aligned with one another along three curved or straight lines or more on the surface 250a of the body 250. Further, when all the terminals 253 are seen along the width direction, the terminals 253 may be disposed at different intervals. Moreover, it is not necessary to alternately dispose the terminals 253 in the line L1 and the terminals 253 in the line L2 along the extending direction.

Embodiment 2

Figure 6:
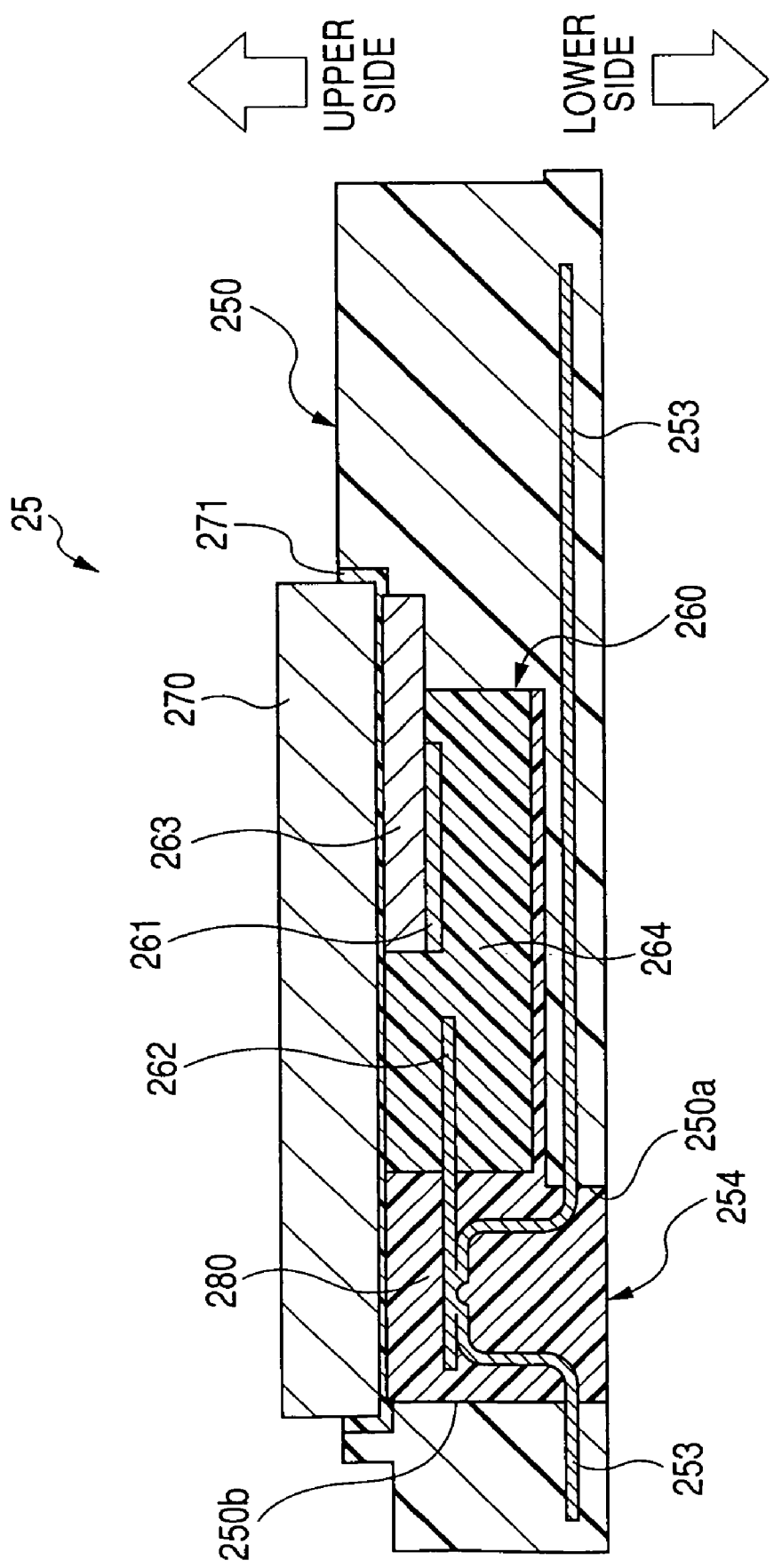
FIG. 6 is a sectional view taken substantially along line III-III of FIG. 2 and shows a lead wire connected with two connecting terminals protruded from different surfaces of the body 250 according to the second embodiment.
Figure 7:
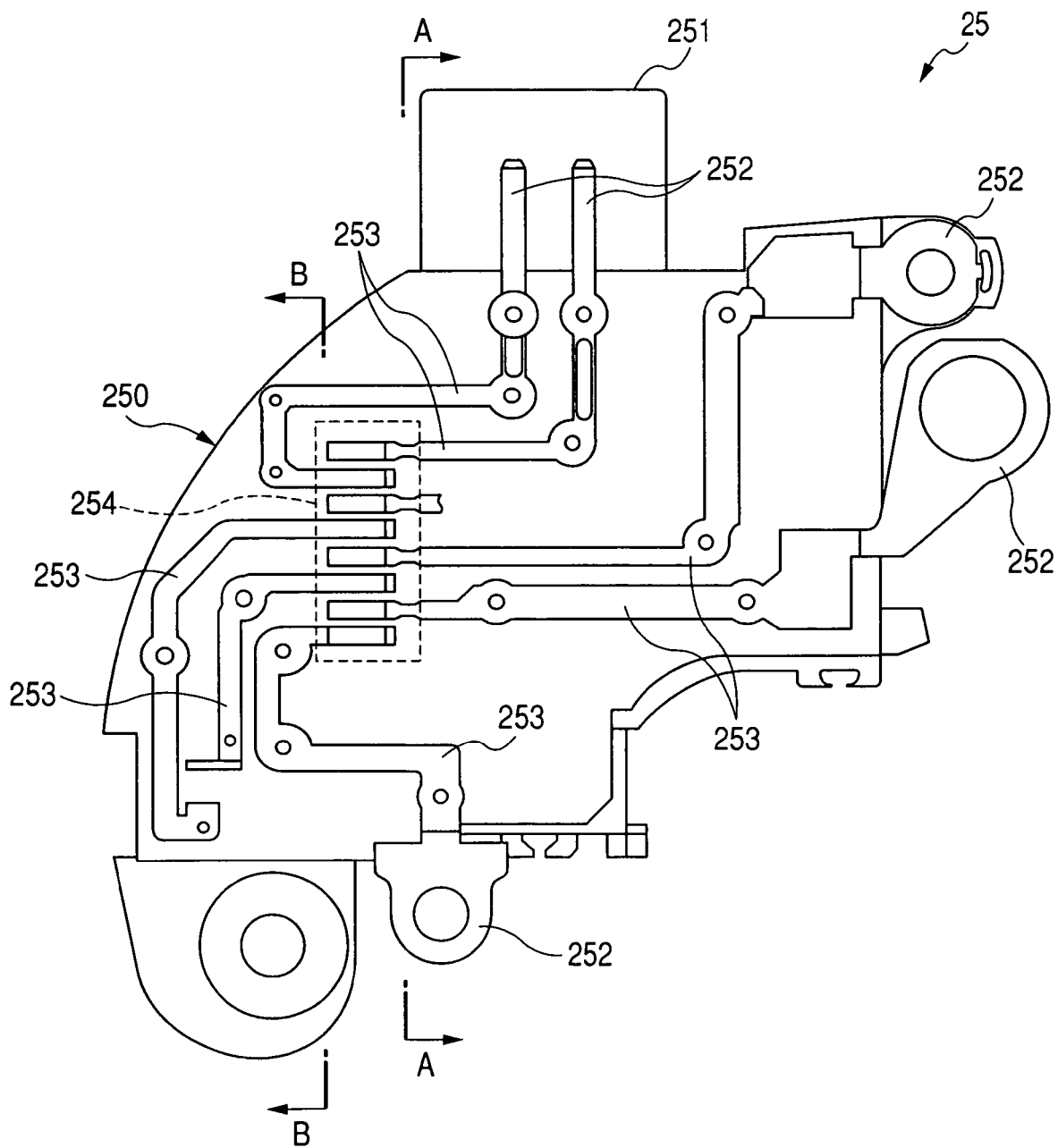
FIG. 7 shows the arrangement of terminals according to the second embodiment.
Figure 8:
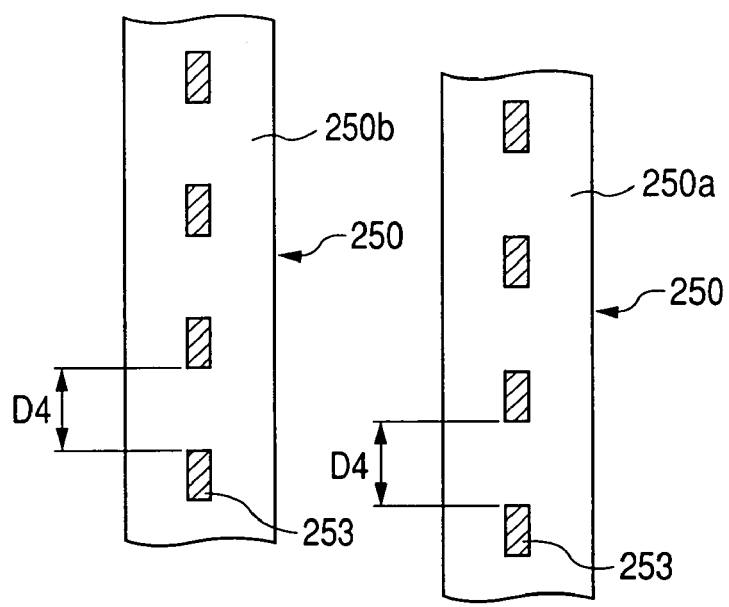
FIG. 8 is enlarged sectional views taken substantially along both line A-A and line B-B of FIG. 7.

FIG. 6 is a sectional view taken substantially along line III-III of FIG. 2 and shows a lead wire connected with two connecting terminals protruded from different surfaces of the body 250 according to the second embodiment. FIG. 7 shows the arrangement of the terminals 253 disposed in the body 250 according to the second embodiment. FIG. 8 is enlarged sectional views taken substantially along both line A-A and line B-B of FIG. 7.

As shown in FIGS. 6 to 8, the holding body 250 has another surface 250b facing the hollow portion 254, in addition to the surface 250a. The surfaces 250a and 250b face each other through the portion 254. The eight terminals 253 inserted into the body 250 is dividable into two groups, the four terminals 253 in one group is protruded from the surface 250a of the body 250 and is disposed so as to be aligned with one another along a straight line L1 at equal intervals, and the four terminals 253 in the other group is protruded from the surface 250b of the body 250 and is disposed so as to be aligned with one another a long a straight line L2 at equal intervals.

The length of each of the surfaces 250a and 250b along the extending direction is substantially equal to that of the surface 250a in the first embodiment. Therefore, an on-surface distance D4 between two terminals 253 adjacent to each other on each of the surfaces 250a and 250b is substantially equal to D2 (D4=D2).

Accordingly, in the same manner as in the first embodiment, a probability of leakage of electric currents among the terminals 253 can be considerably reduced.

In this embodiment, the terminals 253 may be classified into two groups according to polarity of signals transmitted through the terminals 253. For example, terminals 253 for signals set at the positive polarity are disposed to be protruded from the surface 250a, and terminals 253 for signals set at the negative polarity are disposed to be protruded from the surface 250b. Further, two terminals 253 for signals substantially set at the same electric potential are preferably disposed to be adjacent to each other. Accordingly, corrosions and disconnections among the terminals 253 can be reliably reduced.

Modification of Embodiment 2

Figure 9:
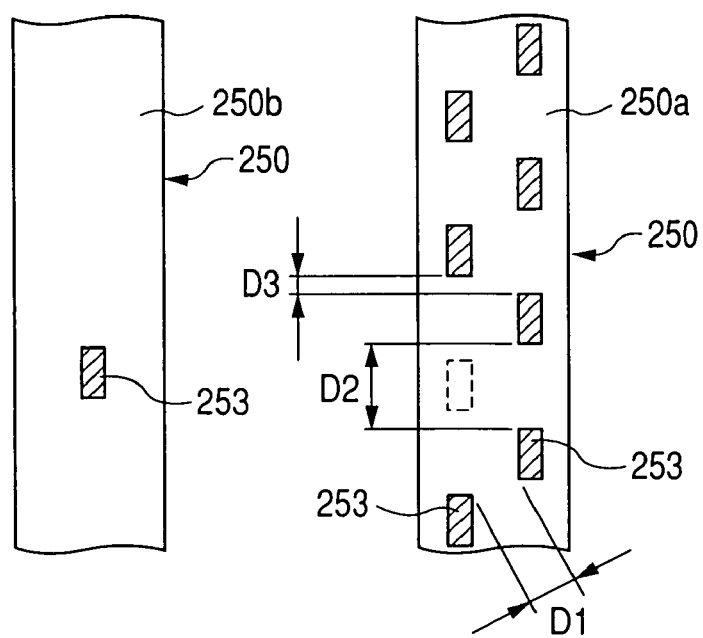
FIG. 9 is enlarged sectional view taken substantially along both line A-A and line B-B of FIG. 7.

FIG. 9 is enlarged sectional view taken substantially along both line A-A and line B-B of FIG. 7.

As shown in FIG. 9, one terminal 253 placed at the third position from the lower side is protruded from the surface 250b of the body 250, and the other seven terminals 253 are protruded from the surface 250a of the body 250. In this case, the on-surface distance between two terminals 253 placed at the second and fourth positions from the lower side is set at the value D2 larger than the value D1.

Accordingly, as compared with the first embodiment, a probability of leakage of an electric current between the second and fourth terminals 253 can be further reduced.

What is claimed is:

1. A voltage controller, comprising:
   an integrated control circuit, having a plurality of lead wires, which is adapted to control an output voltage of an alternator by receiving or outputting signals through the lead wires;
   a plurality of connecting terminals respectively connected with the lead wires, the signals being transmitted through the connecting terminals; and
   a terminal holding body which is adapted to hold the connecting terminals such that portions of the connecting terminals are protruded from a surface of the terminal holding body and are connected with the lead wires,
   wherein the connecting terminals protruded from the terminal holding body are disposed so as to be aligned along a plurality of lines on the surface of the terminal holding body.

2. The voltage controller according to claim 1, wherein the connecting terminals are disposed on the surface of the terminal holding body so as to be aligned along a plurality of straight lines parallel to one another, and each of the connecting terminals disposed in one straight line differs in a position along an extending direction of the straight line from the connecting terminals disposed in another straight line adjacent to the one straight line.

3. The voltage controller according to claim 2, wherein the connecting terminals in one straight line and the connecting terminals in another straight line adjacent to the one straight line are alternately disposed along the extending direction of the straight lines.

4. The voltage controller according to claim 1, wherein a distance between two connecting terminals, respectively, placed in different lines and being adjacent to each other is smaller than a distance between two connecting terminals placed in on each line and being adjacent to each other.

5. A voltage controller, comprising:
   an integrated control circuit, having a plurality of lead wires, which is adapted to control an output voltage of an alternator by receiving or outputting signals through the lead wires;
   a plurality of connecting terminals respectively connected with the lead wires, the signals being transmitted through the connecting terminals; and
   a terminal holding body which is adapted to hold the connecting terminals such that portions of the connecting terminals are protruded from the terminal holding body and are connected with the lead wires,
   wherein the terminal holding body has a plurality of surfaces, and the connecting terminals are classified into a plurality of groups such that the connecting terminals in each group are protruded from one of the surfaces of the terminal holding body.

6. The voltage controller according to claim 5, wherein the connecting terminals in each group are disposed so as to be aligned along a straight line.

7. The voltage controller according to claim 5, wherein the connecting terminals in each group are disposed so as to be aligned along a plurality of lines on the surface of the terminal holding body.

8. The voltage controller according to claim 5, wherein the connecting terminals, through which signals set at the same polarity are transmitted, are protruded from one surface of the terminal holding body.

9. The voltage controller according to claim 8, wherein two connecting terminals, through which signals substantially set at the same electric potential are transmitted, are protruded from one surface of the terminal holding body so as to be adjacent to each other on the surface of the terminal holding body.

10. The voltage controller according to claim 5, wherein the connecting terminals in one group are disposed so as to be aligned along a plurality of lines on the corresponding surface of the terminal holding body, and only one connecting terminal is protruded from another surface of the terminal holding body.

* * * * *